United States Patent
Cros et al.

(10) Patent No.: US 9,682,838 B2
(45) Date of Patent: Jun. 20, 2017

(54) STATIONARY IDLER ROLL WITH LOW COEFFICIENT OF FRICTION

(71) Applicant: Pearl Technologies, Inc., Savannah, NY (US)

(72) Inventors: Laurent Cros, Gloucester, MA (US); Carl S. Johnson, Gloucester, MA (US)

(73) Assignee: Pearl Technologies, Inc., Savannah, NY (US)

( * ) Notice: Subject to any disclaimer, the term of this patent is extended or adjusted under 35 U.S.C. 154(b) by 0 days.

(21) Appl. No.: 15/074,564

(22) Filed: Mar. 18, 2016

(65) Prior Publication Data

US 2016/0272450 A1 Sep. 22, 2016

Related U.S. Application Data

(60) Provisional application No. 62/135,413, filed on Mar. 19, 2015.

(51) Int. Cl.
| | |
|---|---|
| *B65H 20/02* | (2006.01) |
| *B29C 47/08* | (2006.01) |
| *B29C 47/00* | (2006.01) |
| *B65H 27/00* | (2006.01) |
| *B29C 47/90* | (2006.01) |

(52) U.S. Cl.
CPC ......... *B65H 20/02* (2013.01); *B29C 47/0026* (2013.01); *B29C 47/0057* (2013.01); *B29C 47/907* (2013.01); *B65H 27/00* (2013.01); *B65H 2404/113* (2013.01); *B65H 2701/1752* (2013.01)

(58) Field of Classification Search
CPC .. B65H 20/02; B65H 27/00; B65H 2404/113; B65H 2701/1752; B65G 11/166; B65G 11/026; B29C 47/0026
USPC .......................................................... 492/36
See application file for complete search history.

(56) References Cited

U.S. PATENT DOCUMENTS

| | | | | |
|---|---|---|---|---|
| 2,288,124 A | * | 6/1942 | Creighton | E21B 17/1085 175/325.5 |
| 3,060,545 A | * | 10/1962 | Thiel | D06C 3/06 26/99 |
| 3,749,540 A | * | 7/1973 | Upmeier | B29C 47/883 425/326.1 |
| 5,307,973 A | * | 5/1994 | Schmidt | B65H 23/025 226/190 |
| 5,700,489 A | * | 12/1997 | Pottorff | B29C 47/0023 425/326.1 |
| 5,758,242 A | * | 5/1998 | Malespin | G03G 15/0921 399/267 |
| 5,902,685 A | * | 5/1999 | Schroder | B02C 4/305 241/235 |

(Continued)

*Primary Examiner* — Mark A Deuble
(74) *Attorney, Agent, or Firm* — Joseph M. Rolnicki; Evans & Dixon, L.L.C.

(57) ABSTRACT

An idler roll employed in a blown film extrusion line is non turning and a plurality of wear strips are removably attached to the idler roll at circumferentially spaced positions around the idler roll. The wear strips engage blown film passing over the idler roll. The wear strips have reduced coefficients of friction than that of the idler roll, have high wear resistances and the blown film passing over the wear strips cleans and polishes the surface area of the wear strips the film moves across, substantially making the wear strips and the non turning idler roll maintenance free compared with idler rollers with bearings.

20 Claims, 5 Drawing Sheets

(56) References Cited

U.S. PATENT DOCUMENTS

| | | | | |
|---|---|---|---|---|
| 5,942,256 A | * | 8/1999 | Pottorff | B29C 47/0023 |
| | | | | 264/209.4 |
| 6,113,026 A | * | 9/2000 | Pottorff | B29C 55/08 |
| | | | | 226/196.1 |
| 6,453,959 B1 | * | 9/2002 | Johnson | B27B 31/003 |
| | | | | 144/246.1 |
| 7,182,722 B2 | * | 2/2007 | Kim | B65H 75/08 |
| | | | | 492/36 |
| 2005/0015986 A1 | * | 1/2005 | Stebnicki | B29C 47/0019 |
| | | | | 29/895.32 |
| 2005/0050729 A1 | * | 3/2005 | Suzuki | B24B 1/00 |
| | | | | 29/895.32 |

\* cited by examiner

STATIONARY IDLER ROLL WITH LOW COEFFICIENT OF FRICTION

This application claims the benefit of the filing date of provisional Application No. 62/135,413.

FIELD

This application pertains to an idler roll employed in a blown film extrusion line. More specifically, this application pertains to an idler roll employed in a blown film extrusion line where the idler roll is non turning and a plurality of wear strips are removably attached to the idler roll at circumferentially spaced positions around the idler roll. The wear strips engage blown film passing over the idler roll. The wear strips have reduced coefficients of friction, have high wear resistances and the blown film passing over the wear strips cleans and polishes the surface area of the wear strips the film moves across, substantially making the wear strips and the non turning idler roll maintenance free compared with idler rollers with bearings.

BACKGROUND

FIG. 1 is a representation of a blown film extrusion line. The extrusion line represented in FIG. 1 includes an extruder 10 that compacts and melts plastic pellets to form a hot, continuous, viscous plastic liquid. The extruder forces the viscus plastic liquid into an annular die 12. The plastic liquid is extruded from the annular die 12 as a thin walled tubular plastic bubble 14. The bubble 14 is pulled vertically upwardly from the annular die 12 by nip rolls (not shown).

As the tubular bubble 14 is pulled upwardly by the nip rolls, the bubble 14 passes through guides 16. The guides 16 engage in contact around the tubular bubble 14 and center and stabilize the bubble. By keeping the bubble 14 centered between the die 12 and the collapsing frame to be described, the gauge of the bubble can be controlled.

After leaving the bubble guide 16 the tubular bubble 14 is continued to be pulled upwardly by the nip rolls into the collapsing frame 18. The collapsing frame 18 is comprised of opposing panels 20, 22 of slats, rollers, panels or wear strips. The opposing panels 20, 22 are angled toward each other as they extend upwardly. The opposing panels 20, 22 engage against the opposite sides of the tubular bubble 14 as it is pulled upwardly between the panels. The panels 20, 22 begin the flattening and collapsing of the tubular bubble 14.

After leaving the collapsing frame 18 the tubular bubble 14 next passes through the nip rolls and is flattened. After the bubble 14 is flattened, it is redirected to other portions of the blown film extrusion line. This is accomplished by turning bars 24, 26. The turning bars 24, 26 are used where a turn in the direction of the flattened bubble 14 is required, together with some adjustment of the bubble alignment. The turning bars 24, 26 are installed at an angle to both the infeed and outfeed directions of the flattened bubble 14. The flattened bubble 14 wraps itself around the surface of the turning bars 24, 26 and leaves the bars at a right angle to the infeed direction of the bubble 14.

In a conventional blown film extrusion apparatus, after leaving the turning bars 24, 26 the flattened tubular bubble 14 would then be directed to other components of the extrusion line by idler rollers.

The blown film process is a very dirty process that leaves a sticky build up of very small particulate residue on the surfaces of the idler rollers and the bearings supporting the rollers. The build up of the particulate residue requires that all the rotating idler rollers and their bearings in the extrusion line be cleaned periodically to remove the residue from the roller surfaces and the roller bearings. It is not unusual for the build up of particulate residue in the roller bearings to cause the idler rollers to stop turning due to the resistance in the bearings caused by the build up of the residue. Furthermore, because the idler rollers become contaminated with the particulate residue at different rates in conventional blown film extrusion lines it is often not possible to tell which idler roller in the line has stopped turning and is creating resistance to the blown film moving through the line. Once an idler roller stops turning, the friction and wear of the blown film tube sliding over the stopped roller increases dramatically, leading to quality and/or production issues.

SUMMARY

The idler roll of this disclosure is configured to engage in a sliding engagement with and direct a length of film across the idler roll. The idler roll is stationary and non turning. The problem of particulate residue buildup on idler rolls and their bearings is overcome by the non turning idler roll of this disclosure.

The idler roll has a base having a length with a base first end and a base second end at opposite ends of the length of the base. The base has an exterior surface with a generally cylindrical configuration with a center axis that defines mutually perpendicular axial and radial directions relative to the base.

A plurality of lobes are formed on the exterior surface of the base. Each lobe extends axially across the length of the base between the base first end and the base second end. Each lobe has a general mushroom shaped cross-section configuration.

A plurality of wear strips are removably attachable to the plurality of lobes. The wear strips have low coefficients of friction. Each wear strip has a general mushroom shaped cross-section configuration that is larger than the mushroom shaped cross-section configuration of the lobes. Each wear strip is removably attachable to a lobe by one end of the wear strip being inserted over a first end of the lobe at the base first end and the length of the wear strip being slid over the length of the lobe to position a second end of the wear strip at the base first end. The plurality of wear strips are removably attached to the base by sliding the wear strips axially along the axial length of the base from the base second end to the base first end.

An indexing shaft supports the base. The indexing shaft is operable to selectively allow rotation of the indexing shaft and thereby allow rotation of the base with the indexing shaft. The indexing shaft has a release lever mounted on one end of the shaft. The release lever is operable to selectively allow rotation of the indexing shaft and the base on the indexing shaft.

BRIEF DESCRIPTION OF THE DRAWINGS

Further features of the stationary idler roll with low coefficient of friction are set forth in the following detailed description of the idler roll and the drawing figures.

DETAILED DESCRIPTION

The problem of particulate residue build up on idler rolls and their bearings is overcome by the non turning idler roll of this disclosure shown in FIGS. 2-8.

Figure 1:
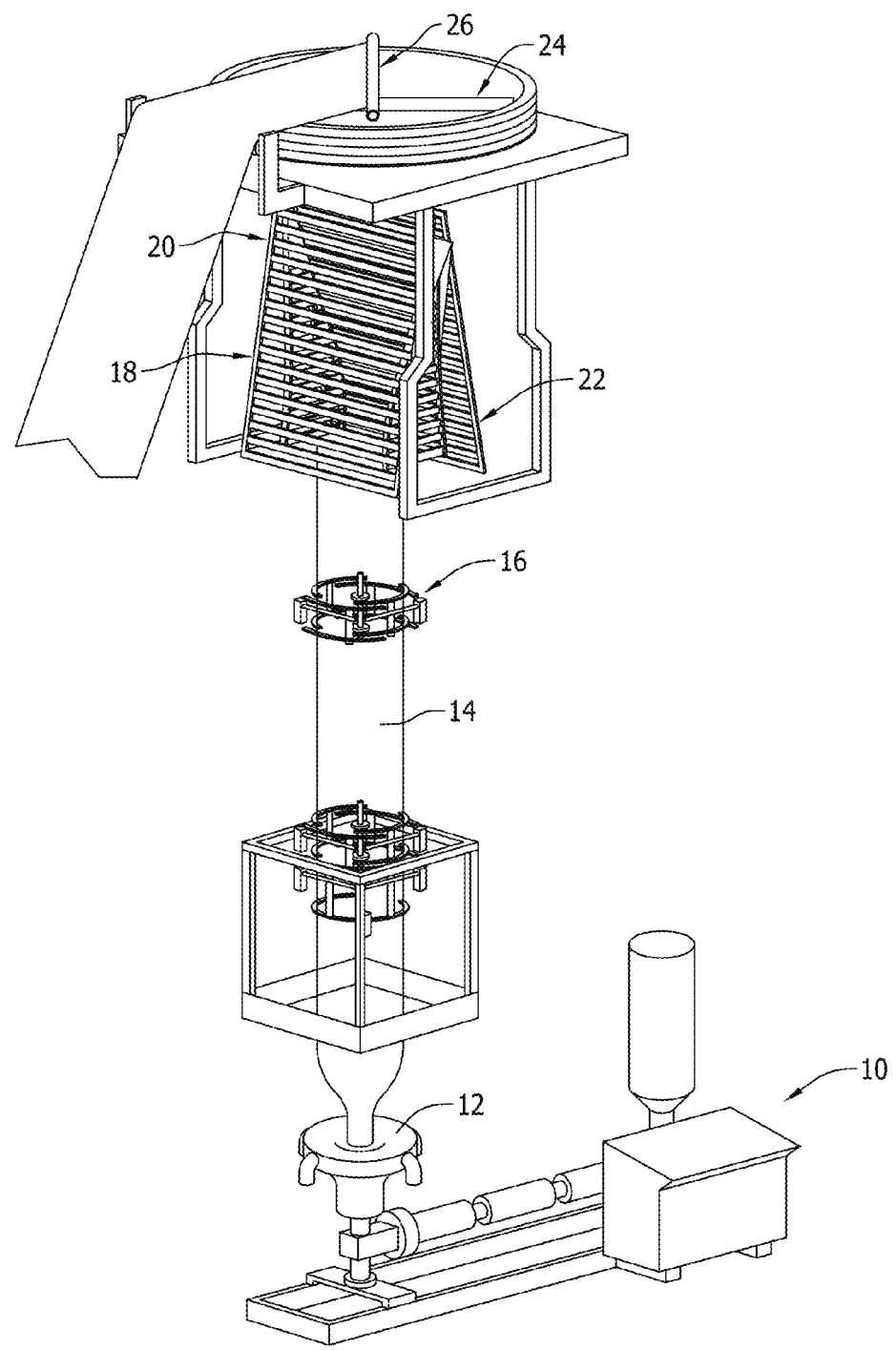
FIG. 1 is a representation of an apparatus that manufactures plastic film for products such as plastic shopping bags by a blown film extrusion process.
Figure 2:
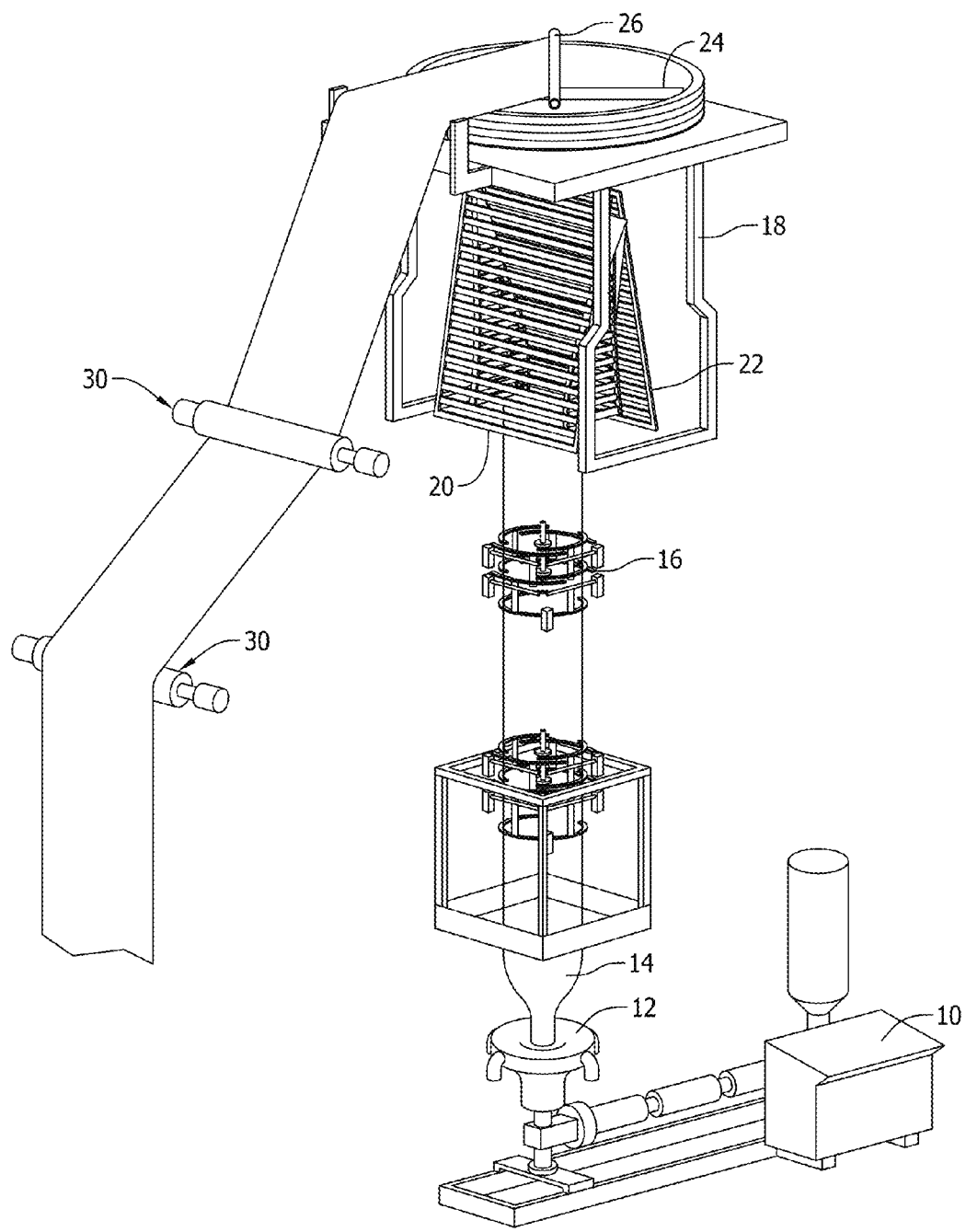
FIG. 2 is a representation of the apparatus of FIG. 1 employing the non turning idler roll of this disclosure.

FIG. 2 is a representation of the blown film extrusion line of FIG. 1, employing the non turning idler roll 30 of this disclosure.

Figure 3:
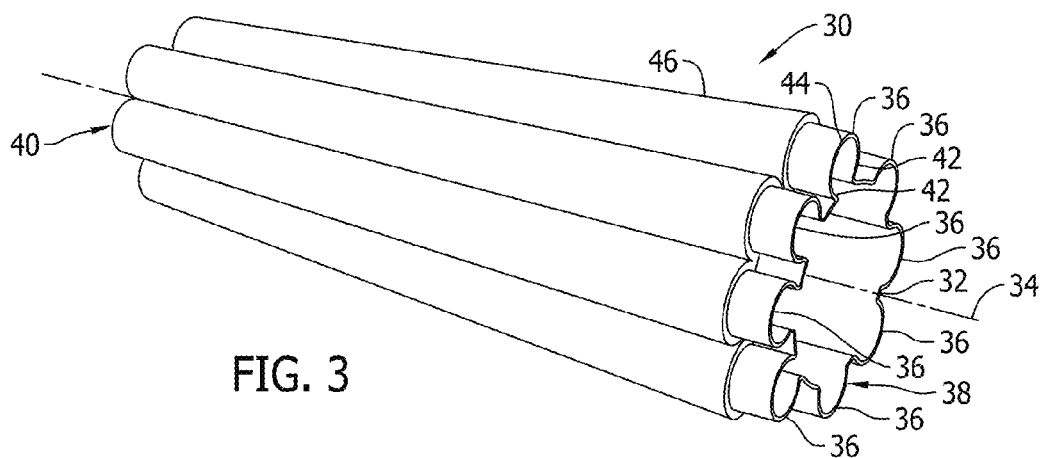
FIGS. 3-5 are representations of the base of the idler roll of this disclosure with different wear strips of different coefficients of friction mounted on the base.
Figure 4:
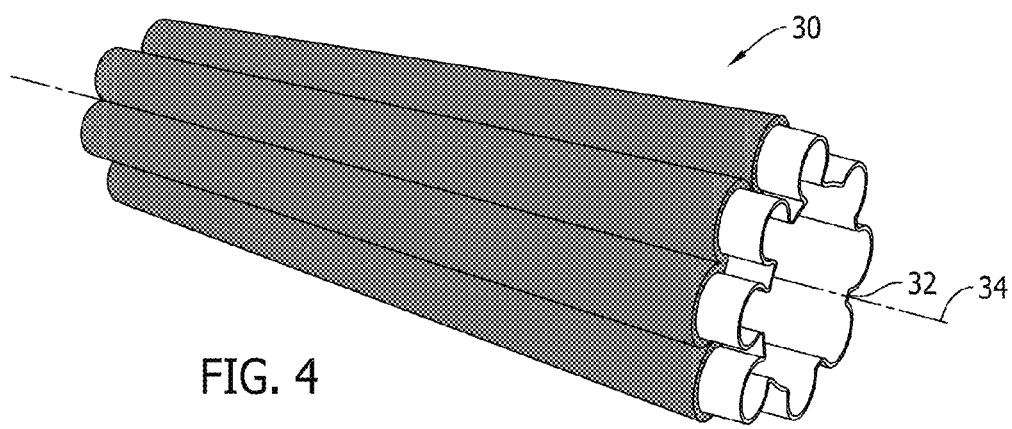
Figure 5:
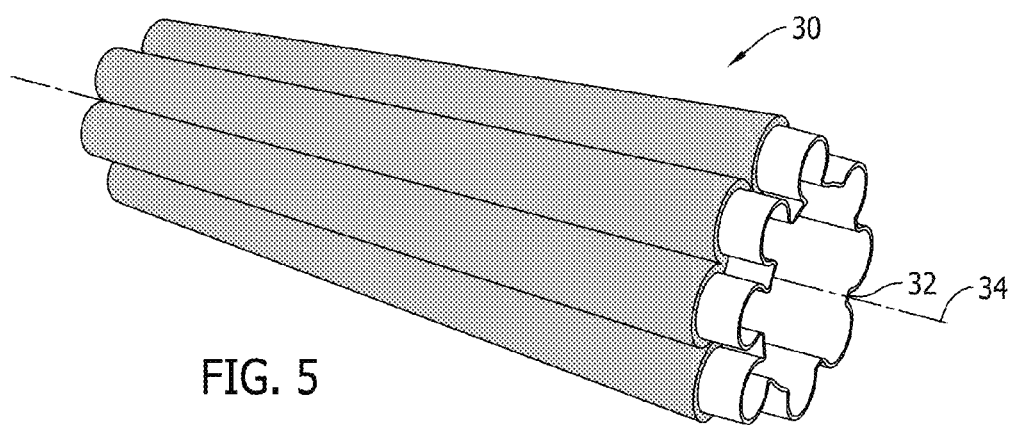

Referring to FIG. 3, the non turning idler roll 30 has a base 32. The base 32 shown in FIG. 3 is tubular, but the base 32 could be solid. The base 32 has a generally cylindrical configuration with a center axis 34 that defines mutually perpendicular axial and radial directions relative to the idler roll 30. The base is constructed of a metal or other equivalent material typically used in constructing component parts of blown film extrusion lines. The base 32 exterior surface is constructed with a plurality of lobes 36 that are circumferentially spaced around the base. In FIG. 3 the idler base 32 is shown constructed with eight lobes 36. The base 32 could also be constructed with fewer or more lobes 36. The lobes 36 are parallel and extend axially across a length of the base between a first end 38 of the base and a second end 40 of the base. Each of the lobes 36 has a general mushroom shaped cross-section with generally parallel stem sidewalls 42 that extend radially away from the base center axis 34 to a convex or curved, semi-circular headwall 44 centered between the two stem sidewalls 42. The cross-section configuration extends along the entire length of each lobe 36.

The mushroom shaped cross-section configuration of the lobes 36 enables wear strips 46 that have a similar but larger cross-section configuration to be removably attached to each of the lobes 36. Thus, like the lobes 36, the wear strips 46 have generally parallel stem side walls 42' that extend radially away from the base center axis 34 when attached to the base, to a convex or curved, semi-circular head wall 44' centered between the two stem side walls 42'. The cross-section configurations of the wear strips 46 extend along the entire lengths of each wear strip 46. The cross-section configurations of the wear strips 46 can be seen in FIG. 6. The wear strips 46 are constructed to slide over the lobes 36 by inserting one end of the wear strip 46 over an end of the lobe 36 at the base first end 38 and then sliding the wear strip 46 along the length of the lobe 36 to the base second end 40. The wear strips 46 can be constructed of materials having different coefficients of friction with high wear resistance. This enables the coefficient of friction and the wear resistance of the idler roll 30 to be changed by merely removing the wear strips from the base 32 such as that shown in FIG. 3, and replacing the wear strips with wear strips having different coefficients of friction and different wear resistances such as the wear strips represented in FIG. 4 and the wear strips represented in FIG. 5. The cross-section configuration of the base 32 with the plurality of lobes 36 reduces the surface area of the idler roll 30 that will come into contact with blown film sliding over the idler roll 30 from that of a conventional idler roller. This further reduces the friction between the idler roll 30 and the blown film sliding over the idler roll.

Figure 6:
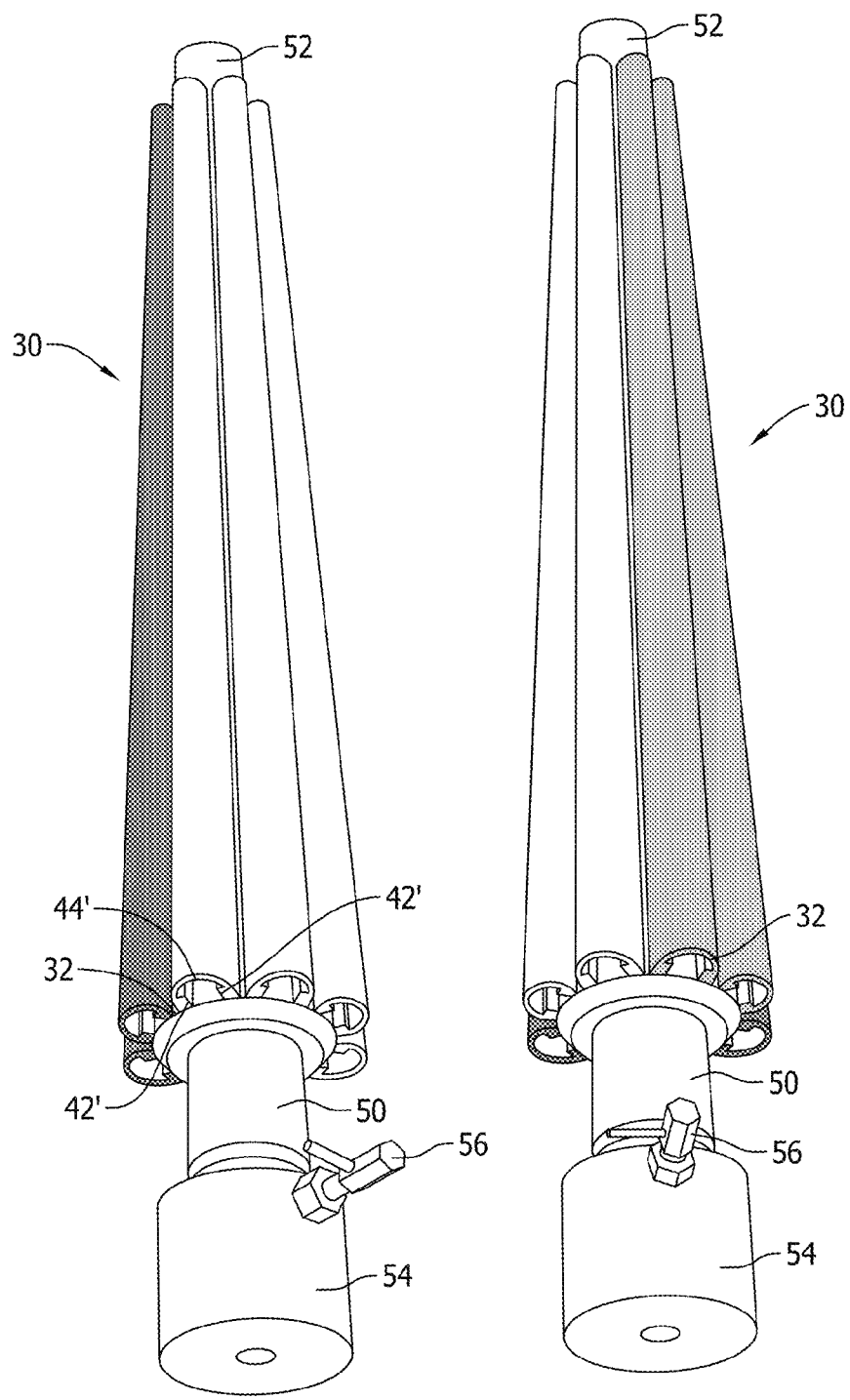
FIG. 6 is a representation of the idler roll mounted on an indexing shaft.

Referring to FIG. 6, the non turning idler roll 30 is supported on an indexing shaft 50. Opposite ends 52, 54 of the indexing shaft 50 are supported for rotation in hubs 52, 54 that would be supported on a structure of a blown film extrusion line to position the non turning idler roll 30 where blown film will slide over the idler roll. One hub 54 at one end of the indexing shaft 50 is provided with a release lever 56. The release lever 56 is operable to selectively allow a fraction of a complete rotation or more than one rotation of the indexing shaft 50 in the hub 54 and thereby rotation of the non turning idler roll 30. Operation of the release lever 56 enables the non turning idler roll to rotate to position selected wear strips 46 in engagement with the blown film sliding over the idler roll 30. This enables the positioning of wear strips 46 having a desired coefficient of friction in engagement with the blown film sliding over the idler roll 30. Additionally, this enables wear strips 46 to be positioned where they will not engage with the blown film so that the wear strips 46 can be removed by sliding the wear strips 46 off of their respective lobes 36, and replaced with new strips on the lobes 36. Thus, the wear strips 46 can be removed and replaced without the blown film extrusion line shutting down. Replacement of the wear strips 46 would be rare because the blown film sliding over the wear strips 46 effectively polishes the wear strips on the non turning idler 30. The film passing over the wear strips 46 cleans and polishes the surface area of the wear strips 46 the film moves across. Thus, the wear strips 46 are substantially maintenance-free when compared to idler rollers with bearings.

Although the non turning idler roll 30 is disclosed in FIGS. 3-6 as being comprised of wear strips 46 positioned around the entire circumference of the idler 30, it is not necessary that the entire circumferential surface of the idler roll 30 be covered with wear strips.

Wear strips 46 positioned around the entire circumference of the idler roll 30 are desired where the film approaching the idler 30 and the film leaving the idler define an angle of 90° or less, or where the indexing feature of the idler 30 and wear strips 46 described with reference to FIG. 6 is desired.

In situations where the film approaching the idler and the film leaving the idler defines an angle of greater than 90°, and the indexing feature of FIG. 6 is not needed, it is not necessary that the entire circumference of the idler roll be provided with wear strips.

Figure 7:
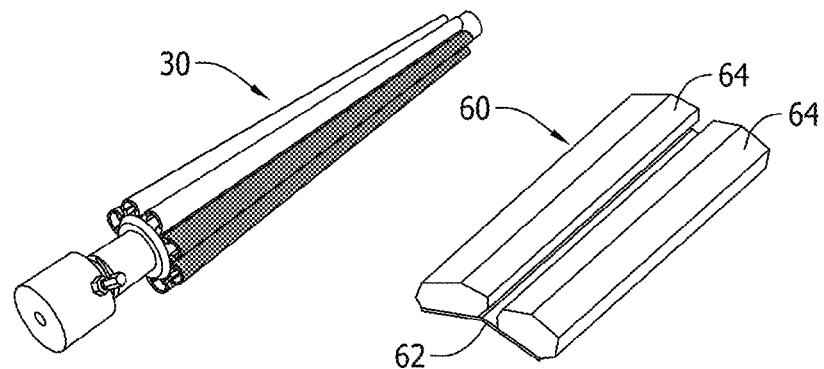
FIG. 7 is a representation of an idler roll that does not have a cylindrical configuration and thus does not have wear strips positioned around a circumference of the idler roll.

Referring to FIG. 7, a comparison of the non turning idler roll 30 having wear strips 46 positioned entirely around the circumference of the idler, and an enlarged, partial view of an idler 60 having a base 62 that supports only two wear strips 64 is shown. It can be appreciated that the idler roll 60 having two wear strips 64 can be constructed at a lesser cost than an idler roll 30 having wear strips 46 positioned entirely around the circumference of the idler.

Figure 8:
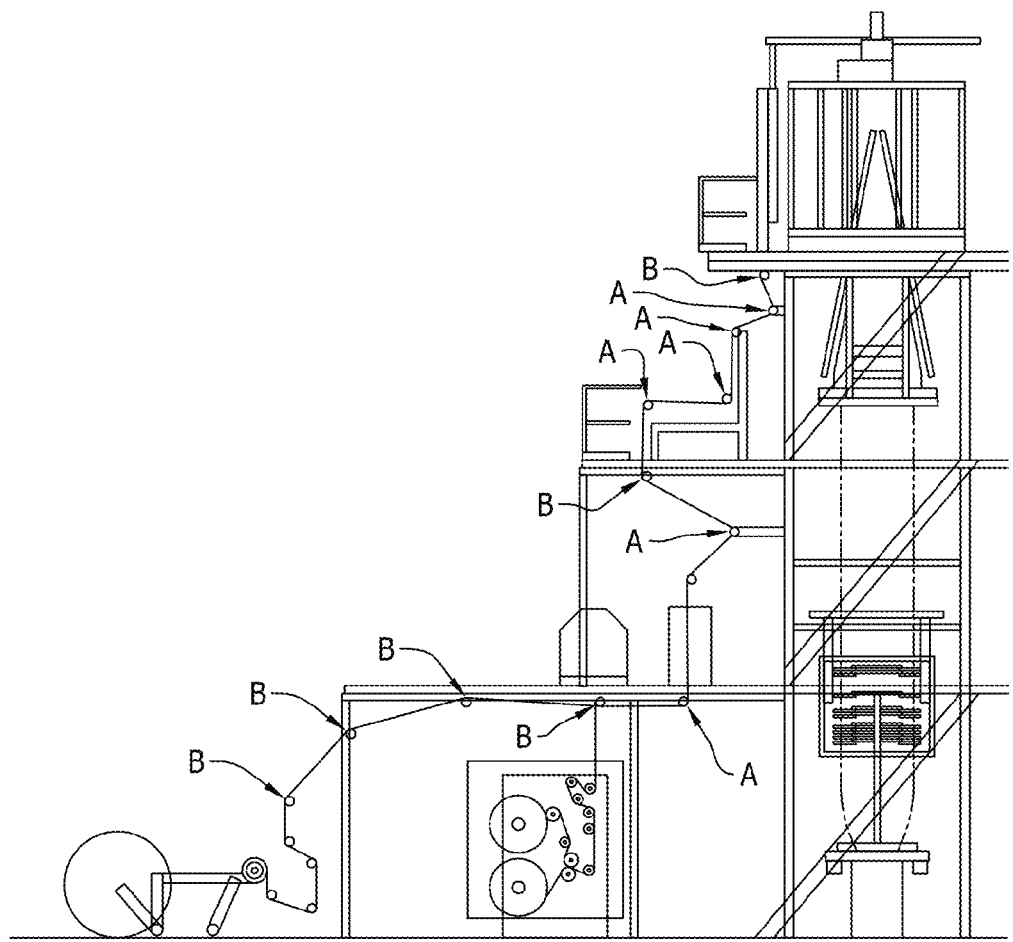
FIG. 8 is a representation of the positioning of idler rolls of this disclosure on a blown film extrusion line.

FIG. 8 is a representation of where idlers 30 having wear strips 46 completely around their circumference could be used in a film processing line, and idlers 60 having wear strips 64 that are not needed entirely around a circumference could be used in the film processing line. In FIG. 8, idlers such as the idler 30 shown in FIGS. 3-6 are labeled "A," and idlers 60 such as that shown in FIG. 7 are labeled "B."

Although the non turning idler roll 30, 60 described herein have been described in combination with a blown film extrusion line, it should be appreciated that the idlers 30, 60 could be used in any production line in place of traditional idler rollers supported on bearings. For example, the idlers 30, 60 of this disclosure could be employed with film winders, in a cast film production line, in a web handling line, in film converting lines, and any other equivalent film production line where traditional idler rollers and bearings are used.

As various modifications could be made in the construction of the apparatus and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. An idler roll configured to engage in sliding engagement with and redirect a length of film moving across the idler roll, the idler roll comprising:
   a base having a generally cylindrical exterior surface with a center axis that defines mutually perpendicular axial and radial directions relative to the base, the base having an axial length with a base first end and a base second end at opposite ends of the axial length of the base;
   a plurality of wear strips, each wear strip having a length between one end of the wear strip and a second end of the wear strip, each wear strip being configured for removable attachment to the base by inserting the one end of the wear strip at the base first end and then sliding the wear strip along the axial length of the base to the base second end;
   an indexing shaft, the base being supported on the indexing shaft;
   a hub at one end of the indexing shaft; and,
   a release on the hub, the release being operable to selectively allow the base to move a fraction of a complete rotation of the base and then stop movement of the base and hold the base stationary to position selected wear strips to engage in sliding engagement with the length of film moving across the idler roll.

2. The idler roll of claim 1, further comprising:
   the exterior surface of the base having a circumference around the exterior surface; and,
   the plurality of wear strips removably attached to the base being circumferentially spaced around the circumference of the base.

3. The idler roll of claim 2, further comprising:
   the plurality of wear strips being removably attachable to the exterior surface of the base with different circumferential distances between adjacent wear strips of the plurality of wear strips removably attached to the base.

4. The idler roll of claim 1, further comprising:
   the plurality of wear strips removably attached to the base being removable from the base by sliding the wear strips axially along the axial length of the base from the base second end to the base first end.

5. The idler roll of claim 1, further comprising:
   the release being operable to selectively allow rotation of the indexing shaft and thereby allow rotation of the base with the indexing shaft.

6. An idler roll configured to engage in sliding engagement with and redirect a length of film moving across the idler roll, the idler roll comprising:
   a base having a generally cylindrical exterior surface with a center axis that defines mutually perpendicular axial and radial directions relative to the base, the base having an axial length with a base first end and a base second end at opposite ends of the axial length of the base;
   a plurality of wear strips, each wear strip having a length between one end of the wear strip and a second end of the wear strip, each wear strip being configured for removable attachment to the base by inserting the one end of the wear strip at the base first end and then sliding the wear strip along the axial length of the base to the base second end; and,
   wear strips of the plurality of wear strips having different coefficients of friction.

7. An idler roll configured to engage in sliding engagement with and redirect a length of film moving across the idler roll, the idler roll comprising:
   a base having a generally cylindrical exterior surface with a center axis that defines mutually perpendicular axial and radial directions relative to the base, the base having an axial length with a base first end and a base second end at opposite ends of the axial length of the base;
   a plurality of wear strips, each wear strip having a length between one end of the wear strip and a second end of the wear strip, each wear strip being configured for removable attachment to the base by inserting the one end of the wear strip at the base first end and then sliding the wear strip along the axial length of the base to the base second end; and,
   wear strips of the plurality of wear strips having different wear resistances.

8. An idler roll configured to engage in sliding engagement with and redirect a length of film moving across the idler roll, the idler roll comprising:
   a base having a generally cylindrical exterior surface with a center axis that defines mutually perpendicular axial and radial directions relative to the base, the base having an axial length with a base first end and a base second end at opposite ends of the axial length of the base;
   a plurality of wear strips, each wear strip having a length between one end of the wear strip and a second end of the wear strip, each wear strip being configured for removable attachment to the base by inserting the one end of the wear strip at the base first end and then sliding the wear strip along the axial length of the base to the base second end;
   an indexing shaft, the base being support on the indexing shaft, the indexing shaft being operable to selectively allow rotation of the indexing shaft and thereby allow rotation of the base with the indexing shaft;
   the indexing shaft having an axial length with opposite first and second ends, a first hub on the first end of the indexing shaft and a second hub on the second end of the indexing shaft, the first hub being configured for stationary attachment to a structure of a blown film extrusion line, the second hub being configured for stationary attachment to a structure of the blown film extrusion line; and,
   the indexing shaft having a release lever mounted on one of the first hub and the second hub, the release lever being operable to selectively allow rotation of the indexing shaft and the base on the indexing shaft relative to the first hub and the second hub.

9. An idler roll configured to engage in sliding engagement with and direct a length of film moving across the idler roll, the idler roll comprising:

a base having a length with a base first end and a base second end at opposite ends of the length of the base, the base having an exterior surface with a generally cylindrical configuration with a center axis that defines mutually perpendicular axial and radial directions relative to the base;

a lobe on the exterior surface of the base, the lobe extending axially across the length of the base between the base first end and the base second end, the lobe having a general mushroom shaped cross-section;

a wear strip removably attached to the lobe, the wear strip having a general mushroom shaped cross-section that is larger than the mushroom shaped cross-section of the lobe, the wear strip being removably attached on the lobe;

an indexing shaft, the base being supported on the indexing shaft;

a hub at one end of the indexing shaft; and, a release on the hub, the release being operable to selectively allow the base to move a fraction of a complete rotation of the base and then stop movement of the base and hold the base stationary to position the wear strip to engage in sliding engagement with the length of film moving across the idler roll.

10. The idler roll of claim 9, further comprising:

the wear strip being removably attached on the lobe by the one end of the wear strip being inserted over a first end of the lobe at the base first end and the length of the wear strip being slid over the length of the lobe to position a second end of the wear strip at the base first end.

11. The idler roll of claim 10, further comprising:

the cross-section configuration of the lobe having a pair of generally parallel stem side walls that extend radially away from the center axis of the base and a curved, semi-circular head wall that is centered between the pair of stem side walls and extends circumferentially between the pair of stem side walls.

12. The idler roll of claim 9, further comprising:

the lobe being one of a plurality of lobes on the exterior surface of the base; and, the wear strip being one of a plurality of wear strips removably attachable to the plurality of lobes.

13. The idler roll of claim 12, further comprising:

the exterior surface of the base having a circumference around the exterior surface; and, the plurality of wear strips removably attached to the base being circumferentially spaced around the circumference of the base.

14. The idler roll of claim 13, further comprising:

the plurality of wear strips being removably attachable to the exterior surface of the base with different circumferential distances between adjacent wear strips of the plurality of wear strips removably attached to the base.

15. The idler roll of claim 12, further comprising:

the plurality of wear strips removably attached to the base being removable from the base by sliding the wear strips axially along the axial length of the base from the base second end to the base first end.

16. The idler roll of claim 12, further comprising:

the release being operable to selectively allow rotation of the indexing shaft and thereby allow rotation of the base with the indexing shaft.

17. An idler roll configured to engage in sliding engagement with and direct a length of film moving across the idler roll, the idler roll comprising:

a base having a length with a base first end and a base second end at opposite ends of the length of the base, the base having an exterior surface with a generally cylindrical configuration with a center axis that defines mutually perpendicular axial and radial directions relative to the base;

a lobe on the exterior surface of the base, the lobe extending axially across the length of the base between the base first end and the base second end, the lobe having a general mushroom shaped cross-section;

a wear strip removably attached to the lobe, the wear strip having a general mushroom shaped cross-section that is larger than the mushroom shaped cross-section of the lobe, the wear strip being removably attached on the lobe;

the lobe being one of a plurality of lobes on the exterior surface of the base;

the wear strip being one of a plurality of wear strips removably attachable to the plurality of lobes; and, wear strips of the plurality of wear strips having different coefficients of friction.

18. An idler roll configured to engage in sliding engagement with and direct a length of film moving across the idler roll, the idler roll comprising:

a base having a length with a base first end and a base second end at opposite ends of the length of the base, the base having an exterior surface with a generally cylindrical configuration with a center axis that defines mutually perpendicular axial and radial directions relative to the base;

a lobe on the exterior surface of the base, the lobe extending axially across the length of the base between the base first end and the base second end, the lobe having a general mushroom shaped cross-section;

a wear strip removably attached to the lobe, the wear strip having a general mushroom shaped cross-section that is larger than the mushroom shaped cross-section of the lobe, the wear strip being removably attached on the lobe;

the lobe being one of a plurality of lobes on the exterior surface of the base;

the wear strip being one of a plurality of wear strips removably attachable to the plurality of lobes; and, wear strips of the plurality of wear strips having different wear resistances.

19. An idler roll configured to engage in sliding engagement with and direct a length of film moving across the idler roll, the idler roll comprising:

a base having a length with a base first end and a base second end at opposite ends of the length of the base, the base having an exterior surface with a generally cylindrical configuration with a center axis that defines mutually perpendicular axial and radial directions relative to the base;

a lobe on the exterior surface of the base, the lobe extending axially across the length of the base between the base first end and the base second end, the lobe having a general mushroom shaped cross-section;

a wear strip removably attached to the lobe, the wear strip having a general mushroom shaped cross-section that is larger than the mushroom shaped cross-section of the lobe, the wear strip being removably attached on the lobe;

the lobe being one of a plurality of lobes on the exterior surface of the base;

the wear strip being one of a plurality of wear strips removably attachable to the plurality of lobes;

an indexing shaft, the base being supported on the indexing shaft, the indexing shaft being operable to selectively allow rotation of the indexing shaft and thereby allow rotation of the base with the indexing shaft;

the indexing shaft having an axial length with opposite first and second ends, a first hub on the first end of the indexing shaft and a second hub on the second end of the indexing shaft, the first hub being configured for stationary attachment to a structure of a blown film extrusion line, the second hub being configured for stationary attachment to a structure of the blown film extrusion line; and, the indexing shaft having a release lever mounted on one of the first hub and the second hub, the release lever being operable to selectively allow rotation of the indexing shaft and the base on the indexing shaft relative to the first hub and the second hub.

20. An idler roll configured to engage in sliding engagement with and direct a length of film moving across the idler roll, the idler roll comprising:

a base having a length with a base first end and a base second end at opposite ends of the length of the base, the base having an exterior surface along the length of the base;

a lobe on the exterior surface of the base, the lobe extending across the length of the base between the base first end and the base second end, the lobe having a general mushroom shaped cross-section;

a wear strip removably attached to the lobe, the wear strip having a general mushroom shaped cross-section that is larger than the mushroom shaped cross-section of the lobe, the wear strip being removably attached on the lobe;

an indexing shaft, the base being supported on the indexing shaft;

a hub at one end of the indexing shaft; and, a release on the hub, the release being operable to selectively allow the base to move a fraction of a complete rotation of the base and then stop movement of the base and hold the base stationary to position the wear strip to engage in sliding engagement with the length of film moving across the idler roll.

* * * * *